United States Patent [19]

Freeman et al.

[11] Patent Number: 4,789,567

[45] Date of Patent: Dec. 6, 1988

[54] ABRASION RESISTANT COATING AND METHOD OF APPLICATION

[75] Inventors: John E. Freeman, P.O. Box 2119, Big Spring, Tex. 79271; Ronald L. Clanton, Big Spring, Tex.

[73] Assignee: John E. Freeman, Big Spring, Tex.

[21] Appl. No.: 3,298

[22] Filed: Jan. 14, 1987

[51] Int. Cl.$^4$ ................................................ B05D 1/10
[52] U.S. Cl. .................... 427/410; 427/388.1; 427/381
[58] Field of Search ................ 427/388.1, 410, 386

[56] References Cited

U.S. PATENT DOCUMENTS

| | | | |
|---|---|---|---|
| 3,042,545 | 7/1962 | Kienle et al. | 427/410 |
| 3,156,580 | 11/1964 | Howard | 427/410 |
| 3,507,357 | 4/1970 | Blome | 427/410 |
| 3,762,939 | 10/1973 | Hunter | 427/388.2 X |
| 4,179,542 | 12/1979 | Christofas | 427/410 |
| 4,180,166 | 12/1979 | Batdorf | 427/386 |
| 4,312,902 | 1/1982 | Murase et al. | 427/388.2 X |
| 4,423,094 | 12/1983 | Dearlove et al. | 427/386 |
| 4,560,579 | 12/1985 | Siadat et al. | 427/386 |
| 4,620,994 | 11/1986 | Suss et al. | 427/410 |

*Primary Examiner*—Thurman K. Page
*Assistant Examiner*—L. R. Horne
*Attorney, Agent, or Firm*—Guy E. Matthews

[57] ABSTRACT

A protective coating of finely divided abrasion resistant inerts carried in a corrosion resistant resin is diluted with a solvent and applied to a surface. The applied coating is cured to achieve either a single layer of inerts dispersed in the resin or two layers including a dense layer of inerts in resin covered by a thin layer of resin.

6 Claims, No Drawings

ABRASION RESISTANT COATING AND METHOD OF APPLICATION

FIELD OF THE INVENTION

This invention relates generally to protective coatings and a method for applying the coating. More particularly the invention pertains to coating comprising an inert abrasion resistant material carried in a corrosion resistant resin and a method for applying the coating by using a diluent solvent and curing steps to achieve desired coating characteristics.

BACKGROUND OF THE INVENTION

Coatings have been developed which exhibit excellent abrasion and corrosion resistance. These coatings have finely divided inert particles dispersed in a resin which is then mixed with a hardening catalyst and applied. The inert particles may be in the form of irregularly shaped granules or spherical depending upon the method of manufacturer and may range in size from a few angstroms to several microns in diameter.

The resin is selected for its corrosion resistant properties and some commonly used include Bisphenol A epoxy, polyester and vinyl ester resins. Ceramic is commonly used as the inert, but any other inert abrasion resistant compound may be used.

One such coating is manufactured by Owens-Corning and marketed under the name Owens-Corning Abrasion Resistant Coating. The Owens-Corning coating contains 90% by weight finely divided ceramic particles dispersed in 10% by weight Bisphenol A epoxy resin. Additionally, a compound has been included which adds flexibility to the coating as applied.

The resin carrying the inert particles must be mixed with an appropriate hardening catalyst before application. Generally both the resin and catalyst are supplied from the coating manufacturer with instructions as to mixing.

When the epoxy and catalyst are mixed as received from the manufacturer, a highly viscous liquid is obtained. Such highly viscous liquid is difficult to apply evenly while covering the surface completely. Some manufacturers, such as Owens-Corning, do not recommend thinning with any solvent, leaving the applicator to determine how best to apply the coating. Without thinning, a coating of 25 mils is necessary to achieve a completely covered, i.e. holiday free, surface.

While experimentation may lead to the best solvent for thinning, there is no indication in the prior art indicating the effect by the thinner used on the final surface. The present invention relates directly to a combination of thinning solvent and curing which leads to a desired surface finish.

Surface preparation has been found to be critical in order to best retain the coating on the surface. Generally, sand blasting to white metal is used and some experimentation has been necessary to determine the necessary anchor pattern.

OBJECTS OF THE INVENTION

In light of the above, it is thus an object of the present invention to provide a method for applying an inert-resin coating evenly and, most economically, in economic thickness.

It is another object of the invention to provide a method for applying an inert-resin coating which produces a selection of final surface finish.

It is further object of the invention to provide a combination of use of thinning solvent and curing to determine the final finish as applied to the surface.

DESCRIPTION OF THE PREFERRED EMBODIMENT

Figure 1:
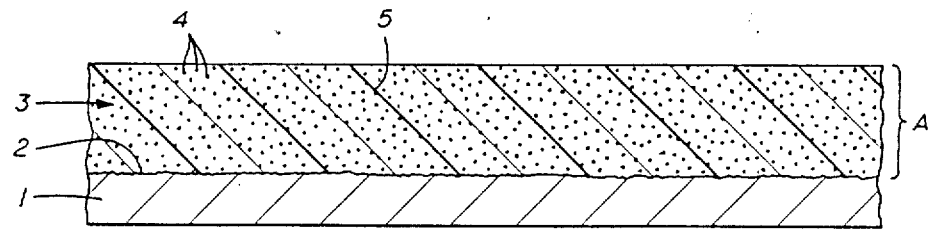
FIG. 1 is a side sectional view of a coating as applied on a surface using a fast cure method.

In the preferred embodiment of the invention, a coating composition having a finely divided inert powder, e.g. 1 angstrom to 1 micron diameter particles, in a resin coating is applied to a specially prepared surface.

The surface is first sand blasted to obtain a 0.5 mil anchor pattern. This anchor pattern has been achieved by sand blasting the surface to white metal with No. 2 grit sand or No. 3 grit steel shot. The surface is then cleaned to remove all traces of dust and other particles left by the sand blasting. Air blowing the surface has been found to be sufficient. Wiping the surface with methylene chloride has also been found to be effective.

The inert-resin composite is then mixed with the appropriate catalyst as recommended by the manufacturer. At the same time, the inert-resin-catalyst is diluted with the appropriate solvent and applied in the conventional manner by spraying upon the surface.

Experimentation has shown that a mixture containing four parts by volume epoxy, one part by volume catalyst, and one-half part by volume solvent allows an even application and complete surface coverage, i.e. holiday free, with coatings as thin as 4 to 5 mils. For many applications, the thickness obtained compares very favorably to the 25 mil coating required to obtain a holiday free coating using the undiluted coating as provided by the manufacturer.

Since the coating itself contains abrasive ceramic particles, the spraying equipment must have abrasion resistant materials, such as carbide, in all wear areas such as tips and nozzles. Such equipment for applying abrasive material is readily available and known in that art.

The particular solvent used to dilute the coating may vary with the resin which carries the inert particles. The solvent used should be (1) mutually soluble with resin-catalyst and (2) flash readily. Additionally, if the coating contains any special compounds, as the Owens-Corning coating, the solvent should not chemically react with such compounds.

After dilution and application, the coating is cured to achieve the desired properties. If the applicator wishes to have the inert dispersed evenly throughout the coating, then the applied coating is fast cured at 250° F. to 300° F. for one to two hours as soon as possible after application. This produces a dull matte finish due to the even dispersion of the particles.

If a more dense inert in resin layer is desired, the coating as applied may be allowed to stand for ½ to 1 hour at room temperature (72° F.) prior to curing at 250° F. to 300° F. This allows the inert to settle in the diluted resin during initial hardening forming a layer 3½ to 4 mils thick which is covered by a glossy layer of resin 1 to 1½ mil thick of corrosion resistant resin. The top layer will be quickly worn away in abrasive service but the more dense inert-resin layer exhibits enhanced abrasion resistance when compared to the single layer. The same two layers effected may be achieved by simply allowing the applied coating to cure at room temperature for 8 to 12 hours.

The following example of a coating and application relates specifically to the Owens-Corning Abrasion Resistant Coating.

In the example, an Owens-Corning coating composition having finely divided ceramic particles and polyamide elastomer carried in a Bisphenol A epoxy resin is applied to a specially prepared surface. The coating, as received from the manufacturer, is 90% by weight ceramic and 10% by weight epoxy resin. Additionally, the coating has one molecule of polyamide elastomer for every forty second ceramic particle.

After the surface has been sandblasted to achieve a 0.5 mil anchor pattern, the coating compound and catalyst are mixed and diluted with a solvent in the proportion of four parts by volume epoxy, one part catalyst, and one half part solvent. As noted, if the flexibility provided by the elastomer is desired the solvent must not chemically react with the elastomer.

For the Owens-Corning abrasion resistent coating, two such solvents have been found-hospital grade isopropyl alcohol (99% by volume alcohol) and HECTROLAX® solvent as manufactured by Ashland Chemical Company. The HECTROLAX®, in addition to being an excellent solvent, also includes mica plates which provide protection of the surface against ultra-violet light.

If the flexibility of the coating is not critical, methylethyl-ketone (MEK) may be used as the solvent. The MEK attacks the elastomer causing a resultant loss in flexibility.

After application, the coating must be cured to achieve the desired rigidity and surface finish. The curing step and the diluent solvent are used in combination to select the final finish. The dilution and curing steps also affect the distribution of the ceramic in the epoxy.

A dull matte finish may be obtained with any of the solvents by immediately fast-curing the coating at 275° F. for one hour. The MEK solvent provides a rigid surface while isopropyl alcohol or HECTROLAX® provide a flexible surface coating. The fast curing disperses the ceramic and elastomer evenly in the epoxy resin throughout the thickness of the coating. The final coating as obtained by the fast curing method is illustrated in FIG. 1. The material to be coated is indicated at 1 with a 0.5 mil surface anchor pattern shown generally at 2. The ceramic particles 4 and elastomer 5 are shown dispersed evenly throughout the epoxy 3 layer A.

A glossy finish may be obtained in one of two ways. The coating may simply be cured at room temperature (72° F.) for 8 to 12 hours. Alternatively the coating may be cured for ½ hour at room temperature and then fast cured at 250° F. to 300° F. for 1 to 2 hours. As above, the flexibility rigidity of the coating is affected by the solvent used. The use of MEK produces a rigid coating while isopropyl alcohol or HECTROLAX® produces a flexible coating.

In addition to producing a glossy finish, the room temperature curing and combination room temperature fast curing causes the ceramic and elastomer to settle into a layer of epoxy approximately 3½ to 4 mils thick leaving a clear epoxy layer approximately 1½ to 1 mil thick. The solvent facilitates this process by reducing the viscosity of the epoxy resin during hardening caused by the catalyst. In effect, this makes a more dense ceramic-elastomer coating nearer the surface coated which enhances the abrasion resistance of the coating. The final coating as obtained by the room temperature curing or combination room temperature fast curing is shown for illustration purposes in FIG. 2. The material to be coated is shown generally at 101 having a 0.5 mil surface anchor pattern shown at 102. The ceramic particles 105 and elastomer molecules 106 settle into a layer B of epoxy 103 approximately 3½ to 4 mils thick. A top layer C of hardened epoxy 104 is approximately 1½ mil thick. As compared to FIG. 1, it can readily be seen that the ceramic and elastomer are more densely carried in the epoxy providing an enhanced abrasion resistance in layer B while layer C may erode away during service.

The glossy surface, in addition to being attractive, is especially useful in the interior coating of pipe in that it reduces friction due to flow, and thus reduces pressure drop and resultant pumping cost.

The above description is not intended to limit the scope of the inventor to that described, since different coatings may be applied using different solvents as selected and different curing processes as experimentation would lead a person of ordinary skill in the art to practice.

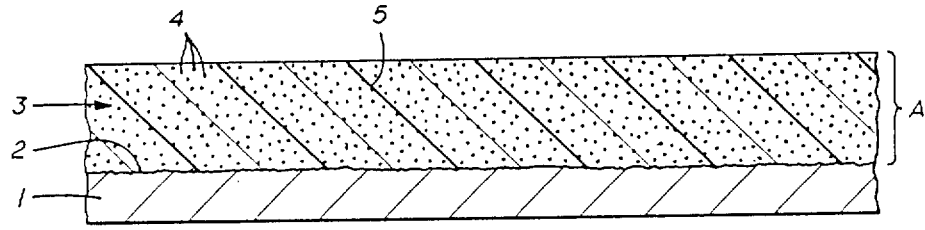

What is claimed is:

1. A method for protecting metal surfaces, metal plates and pipes, said method comprising the steps of:
    (a) sand blasting said surface to provide a prepared surface having a desired anchor pattern;
    (b) removing substantially all dust particulate material from said prepared surface;
    (c) mixing a corrosion resistent resin containing finely divided abrasion resistent particles with the appropriate hardening catalyst for said resin to form a coating mixture;
    (d) diluting said coating mixture with a selected solvent to allow even application of said coating mixture;
    (e) applying said coating mixture to said prepared suface to obtain a desired thickness; and,
    (f) curing said coating as applied at room temperature (72° F.) for eight to twelve hours to obtain a coating on said surface having a first layer of concentrated abrasion resistant particles proximate said surface and a second layer of corrosion resistant resin over said first layer, wherein said corrosion resistant resin comprises 90% by weight finely divided ceramic particles in 10% by weight Bisphenol A epoxy resin including a polyamide elastomer in the ration of about one elastomer polymer molecule for every forty-second ceramic particle.

2. The method of claim 1 wherein said solvent used for dilution is isopropyl alcohol.

3. The method of claim 1 wherein said solvent used for dilution is methyl-ethyl-ketone.

4. A method for protecting metal surfaces, metal plates, and pipes, said method comprising the steps of:
    (a) sandblasting said surface to provide a prepared surface having a desired anchor pattern;
    (b) removing substantially all dust and particulate material from said prepared surface;
    (c) mixing a corrosion resistant resin containing finely divided abrasion resistant particles with the appropriate hardening catalyst for said resin to form a coating mixture wherein said corrosion resistant resin comprises 90% by weight finely divided ceramic particles and a 10% by weight Bisphenol A epoxy resin including a polyamide elastomer in the ratio of about one elastomer polymer molecule for every forty-second ceramic particle;

(d) diluting said coating mixture with a selected solvent to allow even application of said coating mixture;

(e) applying said coating mixture to said prepared surface to obtain a desired thickness; and, (f) sequentially curing said coating as applied first at room temperature (72° F.) for one-half to one hour and than at 250° F. to 300° F. for one to one and a half hours to obtain a coating on said surface having a first layer of concentrated abrasion resistant particles proximate said surface and a second layer of corrosion resistant resin over said first layer.

5. The method of claim 4 wherein said solvent used for dilution is isopropyl alcohol.

6. The method of claim 4 wherein said solvent used for dilution is methyl-ethyl-ketone.

* * * * *

UNITED STATES PATENT AND TRADEMARK OFFICE
CERTIFICATE OF CORRECTION

PATENT NO. : 4,789,567

DATED : Dec. 6, 1988

INVENTOR(S) : John E. Freeman, et al.

It is certified that error appears in the above-identified patent and that said Letters Patent is hereby corrected as shown below:

The Title Page should be deleted to appear as per attached Title Page.

On the Title Page, "6 Claims, No Drawings" should read --6 Claims, 1 Drawing Sheet--.

Figure 2:
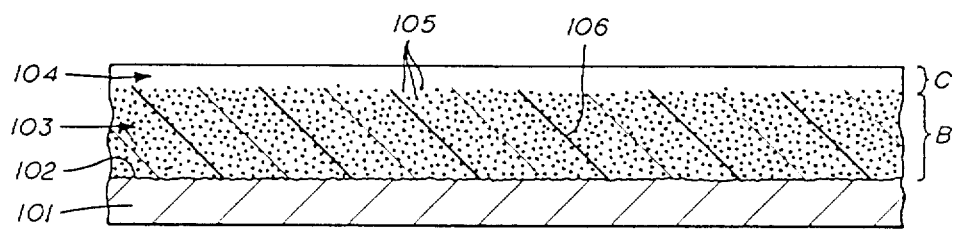
FIG. 2 is a side sectional view of a coating as applied using either room temperature curing or combination room temperature and fast curing.

The Sheet of Drawing consisting of Figures 1 and 2 should be added as per attached sheet.

Signed and Sealed this

Thirtieth Day of May, 1989

Attest:

DONALD J. QUIGG

Attesting Officer

Commissioner of Patents and Trademarks

United States Patent [19]
Freeman et al.

[11] Patent Number: 4,789,567
[45] Date of Patent: Dec. 6, 1988

[54] ABRASION RESISTANT COATING AND METHOD OF APPLICATION

[75] Inventors: John E. Freeman, P.O. Box 2119, Big Spring, Tex. 79271; Ronald L. Clanton, Big Spring, Tex.

[73] Assignee: John E. Freeman, Big Spring, Tex.

[21] Appl. No.: 3,298

[22] Filed: Jan. 14, 1987

[51] Int. Cl.⁴ .................................................. B05D 1/10
[52] U.S. Cl. .............................. 427/410; 427/388.1; 427/381
[58] Field of Search .................. 427/388.1, 410, 386

[56] References Cited

U.S. PATENT DOCUMENTS

| | | | |
|---|---|---|---|
| 3,042,545 | 7/1962 | Kienle et al. | 427/410 |
| 3,156,580 | 11/1964 | Howard | 427/410 |
| 3,507,357 | 4/1970 | Blome | 427/410 |
| 3,762,939 | 10/1973 | Hunter | 427/388.2 X |
| 4,179,542 | 12/1979 | Christofas | 427/410 |
| 4,180,166 | 12/1979 | Batdorf | 427/386 |
| 4,312,902 | 1/1982 | Murase et al. | 427/388.2 X |
| 4,423,094 | 12/1983 | Dearlove et al. | 427/386 |
| 4,560,579 | 12/1985 | Siadat et al. | 427/386 |
| 4,620,994 | 11/1986 | Suss et al. | 427/410 |

Primary Examiner—Thurman K. Page
Assistant Examiner—L. R. Horne
Attorney, Agent, or Firm—Guy E. Matthews

[57] ABSTRACT

A protective coating of finely divided abrasion resistant inerts carried in a corrosion resistant resin is diluted with a solvent and applied to a surface. The applied coating is cured to achieve either a single layer of inerts dispersed in the resin or two layers including a dense layer of inerts in resin covered by a thin layer of resin.

6 Claims, No Drawings